Jan. 21, 1947. L. A. ARNSPARGER 2,414,627
ANIMAL TRAP
Filed April 2, 1945

INVENTOR.
LLOYD A. ARNSPARGER
BY
C. Lauren Maltby
ATTORNEY

Patented Jan. 21, 1947

2,414,627

UNITED STATES PATENT OFFICE 2,414,627

ANIMAL TRAP

Lloyd A. Arnsparger, Los Angeles, Calif.

Application April 2, 1945, Serial No. 586,105

3 Claims. (Cl. 43—93)

This invention relates to trap devices, and more especially to animal traps.

An object of the invention is to provide a simple, practical and efficient trap of the character described.

Another object of the invention is to provide an animal trap which secures the animal against escape by engaging the animal around the head, neck or body portions, rather than by a limb, whereby escape of the animal by gnawing or chewing off the limb is prevented.

A further object of the invention is to provide a novel animal trap adapted to engage the body of the animal in a manner which prevents damage to the fur or tearing of the skin of the animal.

A further object of the invention is to provide an animal trap having multiple trap features, whereby an animal may be trapped by approaching the trap from opposite directions.

Another object is to provide in a trap of the character described novel features of safety when setting the trap jaws or clamp elements.

Other objects and advantages will appear and be brought out more fully in the following specification, reference being had to the accompanying drawing, wherein.

Figure 1:
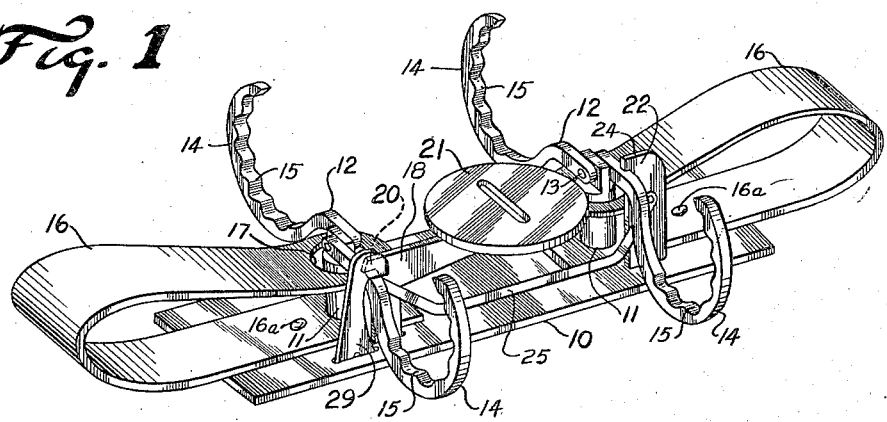
Fig. 1 is a perspective view of an animal trap embodying my invention shown in set position.

Referring more particularly to the drawing, I show a trap having an elongated base plate member 10 of any suitable material, such as iron or sheet steel, on which a pair of posts 11 are suitably secured and extend upwardly in spaced relation as shown. A pair of jaw or clamp members 12 are pivotally secured as at 13 to each post 11, the axis of pivots 13 being longitudinally related to the length of base 10. Jaw members 12 have semi-circular clamping portions 14, the inner edges or surfaces 15 thereof being corrugated by which a firm grip on the body of the animal may be obtained without resulting in a tearing of the skin or damage to the fur of the animal.

Figure 2:
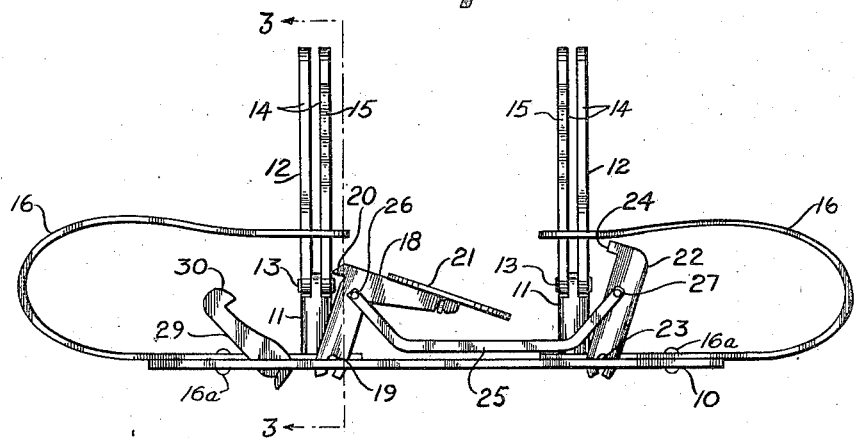
Fig. 2 is a side elevation view of the same shown in operated position.
Figure 3:
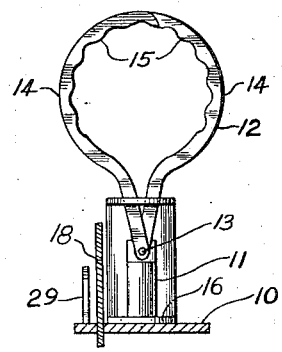
Fig. 3 is a transverse sectional view taken along the line 3—3 of Fig. 2.

A spring 16, which is shown as being a U-shaped strap element is suitably secured as by welding or a rivet 16a at one end to base 10 and is formed with an aperture 17 at the opposite end through which extends post 11 and the lower end portions of jaw members 12 when in the operated position, as seen in Figs. 2 and 3. A second spring 16 is similarly secured for engagement with the jaw members of the other post 11. A trigger member 18 is pivoted to base 10 as at 19 and is formed with a latch 20 which engages one of the jaw members 12 when the jaw has been swung outwardly for setting the trap, the free end of spring 16 being put under tension by pressing downwardly around post 11 which permits jaws 12 to be swung outwardly and latch 20 engaged therewith, as shown in Fig. 1. Trigger 18 is provided with a contact plate 21 secured to the laterally extending portion of trigger 18 and positioned between posts 11 and the pairs of jaw members 12 thereon.

A trigger member 22 is pivoted as at 23 to plate 10 and is formed with a latch 24 for engaging one of the jaw members 12 of the other post 11. A link 25 is pivotally secured as at 26 to trigger 18 and pivoted at 27 to trigger 22 by which construction it will be apparent that upon the actuation of trigger 18 by weight on plate 21 link 25 will cause actuation of trigger 22, thus releasing the jaw members of both sets of jaws, thereby insuring the engaging of the animal around the head, neck or body or a double combination thereof when the trap is sprung. Upon the release of the triggers 18 and 22, as stated, the pairs of jaw members 12 will be forced by the upward pressure of springs 16 thereon to the animal engaging position, as shown in Figs. 2 and 3.

In order to permit the trap to be set with safety to the person setting it I show an auxiliary latch member 29 provided with a latching shoulder 30, the latch 29 being suitably pivoted to base 10 and adapted to be moved to a position to secure one of the jaw members 12 in the position shown in Fig. 1, while the jaws of the other post are being opened and the other spring compressed to permit triggers 18 and 22 to be simultaneously engaged with the respective jaw members. Latch 29 is then retracted to the position shown in Figure 2.

It will be understood that changes and modifications in the construction shown and described may be made without departing from the spirit and scope of the sub-joined claims, for instance, a coiled spring positioned around posts 11 and engaging jaw members 12 would be effective to operate the trap jaws.

Having thus described my invention, what I claim and desire to secure by Letters Patent is:

1. An animal trap as described comprising a base member, a pair of posts on said base, a pair of jaw members pivoted on each said post, a spring engaging each pair of jaw members for movement to closing position, and a trigger mechanism engaging a jaw member of each pair to hold said jaw members in open position.

2. An animal trap as described comprising a base member, a pair of posts on said base, a pair of jaw members pivoted on each said post, a spring engaging each pair of jaw members for movement to closing position, and a trigger mechanism engaging a jaw member of each pair to hold said jaw members in open position, said trigger being disposed between said pairs of jaw members.

3. An animal trap as described comprising a base member, a pair of posts on said base, a pair of jaw members pivoted on each said post, a spring engaging each pair of jaw members for movement to closing position, a trigger mechanism engaging a jaw member of each pair to hold said jaw members in open position, said trigger being disposed between said pairs of jaw members, and a latch member for holding one of said jaw members in open position while the other jaw members are being opened for setting said trigger.

LLOYD A. ARNSPARGER.